April 22, 1958  J. S. ALFORD  2,831,653
COOLING STRUCTURE FOR TURBINE WHEELS
Filed March 8, 1952  2 Sheets-Sheet 1

Inventor:
Joseph S. Alford,
by Richard E. Hosley
His Attorney.

April 22, 1958     J. S. ALFORD     2,831,653
COOLING STRUCTURE FOR TURBINE WHEELS
Filed March 8, 1952     2 Sheets-Sheet 2
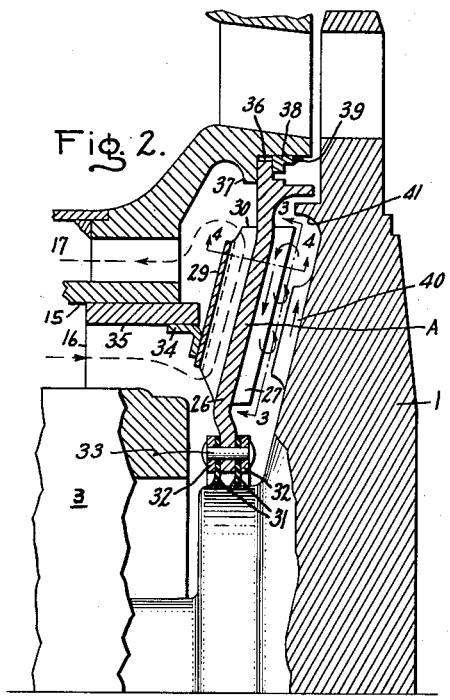
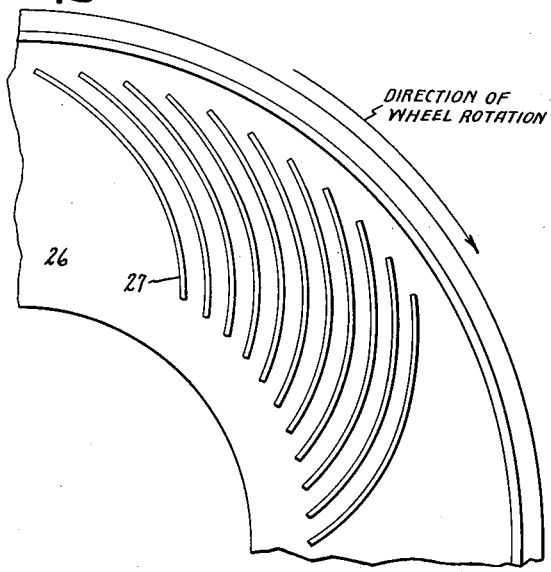
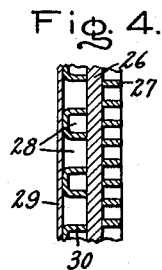
Inventor:
Joseph S. Alford,
by Richard E. Hosley
His Attorney.

United States Patent Office 2,831,653
Patented Apr. 22, 1958

2,831,653
COOLING STRUCTURE FOR TURBINE WHEELS

Joseph S. Alford, Cincinnati, Ohio, assignor to General Electric Company, a corporation of New York Application March 8, 1952, Serial No. 275,613

2 Claims. (Cl. 253—39.15)

This invention relates to high temperature gas turbines and specifically to the cooling of the upstream face of a turbine wheel used to drive aircraft superchargers, but it is to be understood that the invention is not limited thereto necessarily.

Due to the elevated temperature at which turbosuperchargers normally operate, cracking of the turbine wheel or buckets often occurs because of changes in physical properties of the turbine wheel material when subjected to heat, resulting in reduced resistance to fatigue and vibration stresses at high temperatures. Therefore, it is desirable, if not in fact absolutely necessary, that some means be provided for cooling the turbine wheel.

In many types of service, the motive fluid contains substantial quantities of unburned fuel so that severe burning takes place close to the wheel, buckets, or other important structural elements of the turbosupercharger, if air, which is readily available as a cooling fluid, is allowed to mix with the motive fluid containing unburned fuel to form a combustible mixture. When such a mixture is formed, combustion very often occurs in regions where the velocity of the combustible mixture is relatively low (below the velocity of flame propagation in such fluid), because of the elevated temperature of the motive fluid.

In aircraft use, it is important to make all structural elements as light as possible; operating experience has shown that such lightly constructed elements cannot safely withstand the high temperatures which result if combustion is permitted to take place in close proximity thereto. In many instances, it has become essential to cool the turbine wheel by indirect means, for example, by radiation, as well as to furnish sealing means to prevent the cooling fluid from mixing with the motive fluid containing unburned fuel.

Naturally the effectiveness of the heat transfer from the turbine wheel to the coolant is diminished, if indirect cooling means are employed. Accordingly, an object of my invention is to provide an arrangement for obviating some of the above-mentioned difficulties.

Another object is to provide an improved construction for cooling a turbine wheel.

A further object is to provide a new structure and arrangement for more efficient cooling of a turbine wheel by indirect cooling means wherein mixing of the coolant and the motive fluid is minimized.

Still another object of my invention is to provide a more effective cooling structure adjacent the upstream face of an aircraft gas turbine wheel.

These and other objects of invention and advantages will become apparent to those skilled in the art from the following detailed description taken in connection with the drawing in which Fig. 1 is a partly sectional side elevation of a gas turbine driven supercharger embodying my invention;

Fig. 2 is a sectional view on an enlarged scale of a portion of the structure disclosed in Fig. 1;

Fig. 3 is a fragmentary elevational view of the sealing plate which faces the turbine wheel, taken from line 3—3, Fig. 2; and Fig. 4 is a sectional view taken on line 4—4, Fig. 2.

Figure 1:
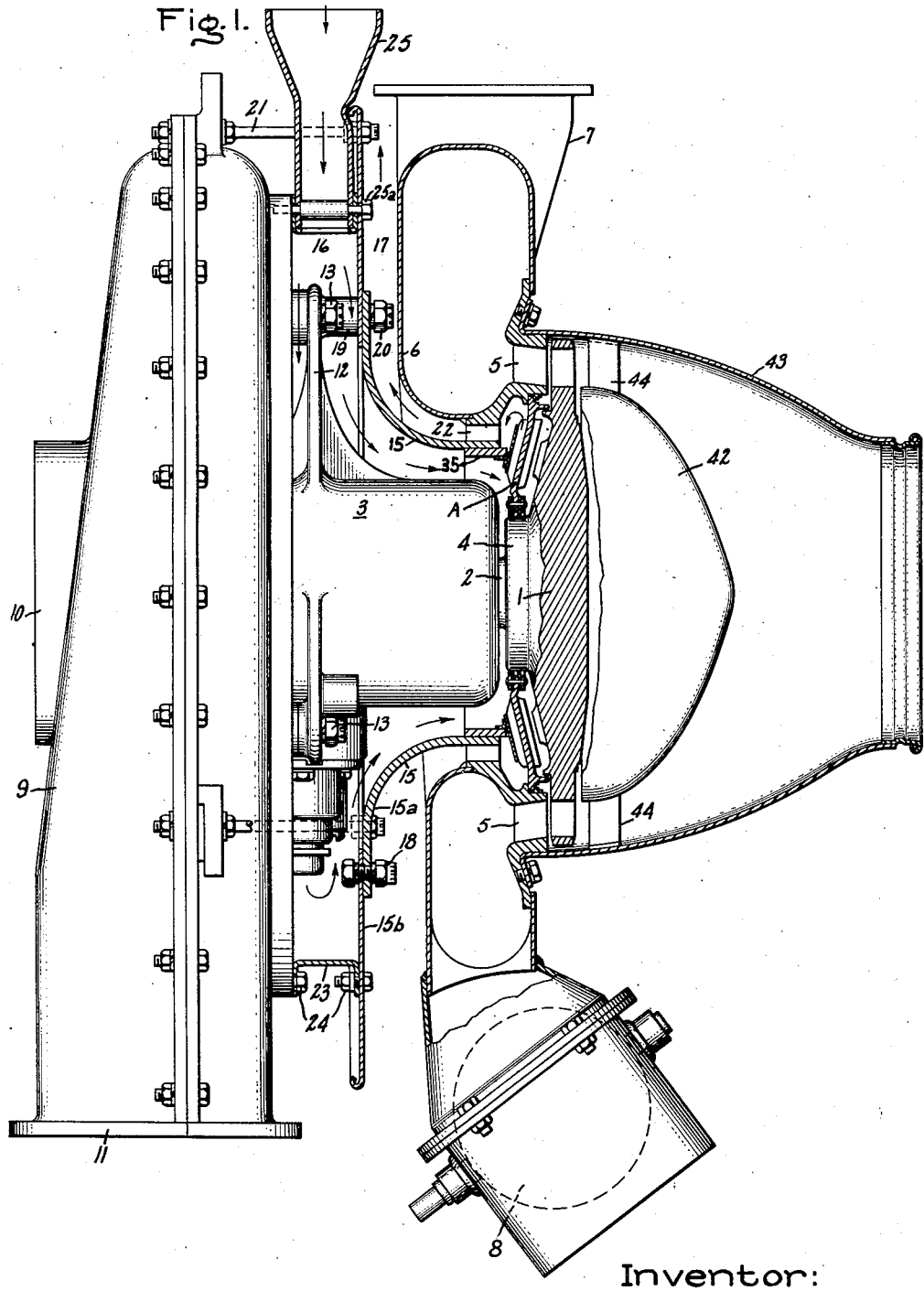

The objects of my invention may be realized by providing extended heat transfer surfaces on the turbine wheel and on the sealing-cooling plate, the arrangement and shape of such surfaces on the turbine wheel side of the plate constituting an important phase of the invention.

Referring now to the drawings, 1 indicates the turbine wheel of a supercharger overhung on the end of shaft 2 carried in a bearing housing 3. On its inner side, wheel 1 is provided with a hub 4.

A high temperature motive fluid is supplied to the buckets of the turbine wheel by a ring of nozzles 5 carried by and forming a part of an annular nozzle box 6, which surrounds bearing housing 3 in spaced relation thereto. This motive fluid, e. g. high temperature exhaust gases from an aircraft engine, is conveyed to the nozzle box through conduit 7. At 8 is the usual waste valve for regulating the supply of fluid to the turbine wheel in a well known manner.

On the other end of shaft 2 is an impeller of a centrifugal compressor, which is located in compressor casing 9. The inlet to the compressor is indicated at 10 and the discharge at 11. The compressor casing 9 is spaced axially from nozzle box 6 and is supported from bearing housing 3 by a plurality of spaced arms 12 formed integral with the housing and attached by suitable threaded fastenings 13 to the compressor casing.

The structure so far described is common and is to be taken as typical of any suitable gas turbine driven compressor or turbosupercharger.

Located in the annular space defined by the nozzle box, the compressor casing and the bearing housing, is an annular curved wall 15, which divides this space into two curved annular passages 16 and 17 and serves to reduce the radiation of heat from the nozzle box towards the bearing housing. In the present instance, wall 15 is represented as being formed by the main support baffle 15a and the annular cooling air shroud disk 15b, suitably fastened together by bolts 18. The radially inward edge of wall 15a terminates adjacent but spaced from the web of turbine wheel 1; the outer edge of disk 15b terminates somewhat beyond the outer peripheral portion of nozzle box 6. Wall 15 is supported at its central portion by a plurality of circumferentially spaced posts 19 formed integral with arms 12 and against which the wall rests and to which it is attached by bolts 20. It is supported at its periphery by a plurality of spaced bolts 21 which at one end are attached to the compressor casing flange and at the other end to the wall. Further, wall 15 is attached at its inner edge to webs 22 suitably welded to the wall and to the adjacent surfaces of nozzle box 6 and bearing housing 3. Thus, wall 15 is fixed rigidly in position in spaced relation to the nozzlebox, the compressor casing and the bearing housing.

Annular passage 16, for the admission of cooling air, is closed around its periphery by a circular wall or shroud 23, having outturned flanges which are attached to wall 15 and to the compressor casing by rings of spaced bolts 24. At its upper end, wall 23 is provided with an opening, into which is fastened an air admission funnel or ram 25 by means of bolts 25a.

When the supercharger is mounted on an aircraft, ram 25 is connected with a suitable conduit (not shown), having an open end which faces into the slip stream and which serves to convey air therefrom into ram 25 and through it to passage 16. Thus, passage 16 is supplied with cooling air at a pressure somewhat above ambient atmospheric pressure. Obviously, cooling air may be obtained from other suitable sources.

At the inner end of wall 15 is a sealing-cooling shield or plate assembly A, shown in enlarged section in Fig. 2. It consists of an annular metallic plate 26, with a series of spiral vanes 27 located on the side facing the turbine rotor and a series of radial passages 28 on the open or exposed side of the plate defined by annular member 29 spaced from plate 26 by U-shaped channel members 30 welded to both the plate and annular member. The passages 28 connect the curved annular passages 16 and 17. Packing or sealing rings 31 are used to prevent flow of cooling air between the plate assembly A and rotating hub 4 into the space defined by the sealing-cooling plate and the turbine wheel. These sealing rings 31 may be made of copper or other suitable material and are held between suitable metal rings 32 to which they are fastened by rivets 33.

Annular plate 26 of shield assembly A is attached to wall 15 by circumferentially spaced angle bars 34 welded to member 29 and to ring 35 which forms a continuation of and is fixed to wall 15. Further support is provided annular plate 26 by fitting it into a sealing groove 36, formed between flange 37 on the nozzle diaphragm and a ring 38 secured to the nozzle box wall by a weld 39 (Fig. 2).

To preclude excessive heating of the discharge side of the turbine wheel, a conventional shield 42 is concentrically disposed within the exhaust hood 43 adjacent the turbine wheel and is supported on the wall of the hood by a plurality of circumferentially spaced vanes 44 for directing the discharge flow of the motive fluid.

On the intake side of the turbine wheel, the flow path of cooling air is shown by the arrows in Fig. 1 and by the broken line of arrows in Fig. 2. Air flows from ram 25 into passage 16, then down over and across the end of bearing housing 3 and through the inner curved portion of annular passage 16 into the passage 28 between the plate 26 and member 29, entering adjacent the bearing housing near the central portion of the wheel, and flowing radially outward into passage 17 for discharge into the atmosphere.

In flowing over the bearing housing, the air absorbs heat from it, after which it flows along the open or exposed face of the sealing-cooling plate assembly A further absorbing heat therefrom. Thus, the coolest air flows over the bearing housing, which is cooler than the turbine wheel, and thence parallel to the turbine wheel, from the cooler to the hotter portion thereof, the latter being adjacent the buckets. This flow arrangement serves to give the most efficient cooling of all parts contacted, which is increased by applicant's use of spiral vanes 27 on the turbine wheel side of the sealing-cooling plate assembly A, in combination with radial vanes 40 on the side of the turbine wheel facing the plate assembly.

These radial vanes on the turbine wheel effect a pumping action on the motive fluid which has leaked into the space between the plate assembly and the turbine wheel. This fluid will flow outward radially until it strikes the fillet portion of the rim at 41, where it turns inwardly and is cooled by the extended curved spiral vanes 27 on the stationary plate assembly. It is desirable to have this cooled motive fluid flow as far radially outward as possible against the turbine wheel face before flowing radially inward to be cooled by the extended surfaces on the sealing plate, because the hottest and so the most critical portions of the wheel are at the outer radii of the wheel rim.

The cooling of the fluid resulting from the transfer of heat to plate 26 is increased because the radial inflow on the turbine wheel side of the sealing-cooling plate assembly is counter to the radial outflow of the cooling air on the open or exposed side of the plate assembly.

The question arises as to possible use of concentric circular baffles or axial vanes on the plate assembly. While it is true that such axial vanes adjacent the outer circumference cut down diametrical flow across the face of the turbine wheel, at the middle and inner radii of the wheel, radial component and recirculating flow is preferred in order to more effectively utilize the cooler inner portions of the air cooled sealing plate. For on the cooling air side of the sealing plate, the highest heat transfer coefficients occur at the smaller radii because the boundary layer is just forming and consequently is very thin.

If a series of concentric circular seals or baffles are used between the sealing plate and the turbine wheel, it is evident that the innermost radial circular bands of fluid would be the coolest, but would not then flow radially outward against the hottest outer parts of the wheel rim. It should be evident that radial outflow of the cooled fluid is necessary.

The orientation of the extended curved surfaces or spiral vanes on the stationary sealing plate is of prime importance in reducing rotation losses and corresponding heating due to the fan action of the rotating turbine wheel. One way to reduce such losses and at the same time minimize shock losses at a fan inlet is to have the tangential entering gas velocity directly proportional to the radius, so that at every radius, this gas velocity will be equal to the tangential vane speed. These considerations suggest that a proper form of the stationary vanes 27 is a spiral of Archimedes. It will be recalled that such a spiral is a curve traced by a point which, starting from an origin, moves with uniform velocity along a radius, which itself revolves with uniform angular velocity about the same origin. Thus, it is evident that if the radial gas velocity is maintained constant in a passage whose walls are portions of the spiral of Archimedes, the tangential velocity will be everywhere directly proportional to the radius. Since on the radial rotating vanes, the tangential velocity is directly proportional to the radius, it is seen that gas entrance shock losses can be considerably reduced or eliminated by the use of the above combination of spiral and radial vanes.

In order to obtain maximum heat transfer coefficient by keeping the boundary layer thin, I prefer to cause the fluid to flow over the vanes in short sweeps or passes, rather than as uninterrupted flow along an extended channel. This is accomplished by favoring the more or less continuous interchange of fluid between the rotating vanes on the turbine wheel and the stationary vanes on the sealing plate so that the actual distance in which any particular mass of fluid maintains contact with the vanes is kept small.

The flow of fluid being pumped and the interchange flow are best shown in Fig. 2 by the solid and curved arrows, respectively. The curvature of the stationary vanes causes a higher static pressure on the concave surface than on the opposite and adjacent convex surface, which difference in pressure tends to cause the fluid to flow out of the stationary channel toward the rotating fan vanes. Therefore, the boundary layer is prevented from thickening along plate 26 and insulating the heat transfer process, as occurs with an uninterrupted flow, so that the effectiveness of heat transfer from the motive fluid to plate 26 is thus greatly improved.

The number of the vanes to be used is largely determined by experiment, taking into consideration proper guidance of the fluid and possible friction losses. In general, a square cross sectional passage between vanes will keep frictional resistance at a minimum.

In addition to providing added surface area for cooling of the fluid by forced convection, the orientation of the extended surfaces is also in a direction to favor the wheel cooling by radiation effects.

It should be noted that alternative configurations and orientations of extended surfaces on both the plate assembly and turbine wheel are possible, providing the prevailing conditions for the reduction of rotation losses are satisfied.

The disclosed combination of structural elements indirectly cools the turbine wheel satisfactorily, the steps including the conduction of heat through the turbine wheel 1 to the radial vanes 40 where the radially outwardly flowing fluid cools it; then this fluid is cooled by the spiral vanes 27 on the disk 26 of the sealing-cooling plate assembly A, which in turn are cooled by the air passing through the passages 28 on the open side of the plate assembly.

In accordance with the provisions of the patent statutes, I have described the principle of operation of my invention, together with an apparatus which I now consider to represent the best embodiment thereof, but I desire to have it understood that the apparatus shown is only illustrative and that the invention may be carried out by other means.

What I claim as new and desire to secure by Letters Patent of the United States is:

1. In a high temperature fluid pressure turbine, bearing means, a shaft supported by said means, a bucket wheel mounted on said shaft, a nozzle box surrounding said bearing means in spaced relationship therewith and with said wheel, a plate assembly axially spaced from said wheel and substantially parallel thereto, an annular curved wall structure located between said nozzle box and said bearing means to provide passages which with said plate assembly form a flow path for conveying cooling air in turn past said bearing means, said plate assembly, and said nozzle box, said plate assembly having means for sealing said passages from said wheel, fluid circulating means on said plate assembly and said wheel comprising spiral vanes forming passages on said plate assembly and radial vanes forming passages on said wheel, said vanes extending toward each other to circulate a fluid therebetween during rotation of said wheel, means provided adjacent the radial outer ends of said vanes for redirecting said circulating fluid radially inwardly, and said spiral vanes being so proportioned that at every radius in the passages defined thereby the tangential component of velocity of said fluid is directly proportional to its radial distance from the center of rotation of said wheel.

2. In combination with a turbine wheel, a cooling device therefor comprising a plate assembly adjacent and substantially parallel to a face of said turbine wheel, radial vanes on said turbine wheel face to pump a fluid between said turbine wheel and said plate assembly in a generally radially outward direction, spiral vanes on the face of said plate assembly adjacent said turbine wheel face, said spiral vanes extending towards said radial vanes, said spiral vanes being shaped to conduct said fluid in a generally radially inward direction, means provided adjacent the radial outer ends of said vanes for redirecting said circulating fluid radially inwardly, and means located on the opposite side of said plate assembly, said means defining a flow path for conducting a cooling fluid against said opposite side of said plate assembly.

References Cited in the file of this patent

UNITED STATES PATENTS

| | | |
|---|---|---|
| 2,390,506 | Buchi | Dec. 11, 1945 |
| 2,414,840 | Streid | Jan. 28, 1947 |
| 2,414,841 | Streid | Jan. 28, 1947 |
| 2,432,359 | Streid | Dec. 9, 1947 |
| 2,434,134 | Whittle | Jan. 6, 1948 |
| 2,440,069 | Bloomberg | Apr. 20, 1948 |
| 2,442,579 | Auger | June 1, 1948 |

FOREIGN PATENTS

| | | |
|---|---|---|
| 584,873 | Great Britain | Jan. 24, 1947 |